United States Patent
Ozawa et al.

(10) Patent No.: US 10,403,312 B2
(45) Date of Patent: *Sep. 3, 2019

(54) MAGNETIC TAPE DEVICE AND MAGNETIC REPRODUCING METHOD

(71) Applicant: FUJIFILM Corporation, Tokyo (JP)

(72) Inventors: Eiki Ozawa, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,592

(22) Filed: Mar. 14, 2018

(65) Prior Publication Data
US 2018/0286439 A1    Oct. 4, 2018

(30) Foreign Application Priority Data
Mar. 29, 2017    (JP) ................................ 2017-065523

(51) Int. Cl.
*G11B 5/39*    (2006.01)
*G11B 5/008*    (2006.01)
(Continued)

(52) U.S. Cl.
CPC ........ *G11B 5/3909* (2013.01); *G11B 5/00813* (2013.01); *G11B 5/70* (2013.01); *G11B 5/78* (2013.01); *G11B 15/62* (2013.01)

(58) Field of Classification Search
CPC ..... G11B 5/39; G11B 5/3909; G11B 5/00813; G11B 5/6005
(Continued)

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

Notice of Allowance dated Aug. 27, 2018 in U.S. Appl. No. 15/920,635 (now U.S. Pat. No. 10,170,144).

(Continued)

*Primary Examiner* — Allen T Cao
(74) *Attorney, Agent, or Firm* — Sughrue Mion, PLLC

(57) ABSTRACT

The magnetic tape device includes a TMR head and a magnetic tape, in which the magnetic tape includes fatty acid ester in a magnetic layer, Ra measured regarding a surface of the magnetic layer is 2.0 nm or smaller, full widths at half maximum of spacing distribution measured by optical interferometry regarding a surface of the magnetic layer before and after performing a vacuum heating with respect to the magnetic tape are greater than 0 nm and 7.0 nm or smaller, a difference between spacings before and after the vacuum heating is greater than 0 nm and 8.0 nm or smaller, and a ratio of an average area Sdc of a magnetic cluster of the magnetic tape in a DC demagnetization state and an average area Sac of a magnetic cluster thereof in an AC demagnetization state measured with a magnetic force microscope is 0.80 to 1.30.

12 Claims, 1 Drawing Sheet

(51) Int. Cl.
  *G11B 15/62* (2006.01)
  *G11B 5/70* (2006.01)
  *G11B 5/78* (2006.01)

(58) Field of Classification Search
  USPC .............................................. 360/90, 85, 75
  See application file for complete search history.

(56) References Cited

U.S. PATENT DOCUMENTS

| | | | |
|---|---|---|---|
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,921,592 B2 | 7/2005 | Tani et al. |
| 6,939,606 B2 | 9/2005 | Hashimoto et al. |
| 6,950,269 B1 | 9/2005 | Johnson |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 10/2016 | Xia et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 | 5/2018 | Kaneko et al. |
| 10,008,230 B1* | 6/2018 | Ozawa ..................... G11B 5/71 |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0232883 A1 | 10/2006 | Biskeborn et al. |
| 2007/0009769 A1 | 1/2007 | Kanazawa |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |

(56) References Cited

U.S. PATENT DOCUMENTS

| | | |
|---|---|---|
| 2013/0260179 A1 | 10/2013 | Kasada et al. |
| 2013/0279040 A1* | 10/2013 | Cideciyan ............ H03M 13/13 360/53 |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1* | 10/2018 | Ozawa .................... G11B 5/70 |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-060819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-038579 A | 2/2005 |

(56) References Cited

FOREIGN PATENT DOCUMENTS

| JP | 2005-243063 A | 9/2005 |
|---|---|---|
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-49731 A | 3/2010 |
| JP | 2011-48878 A | 3/2011 |
| JP | 2011-210288 A | 10/2011 |
| JP | 2011-225417 A | 11/2011 |
| JP | 2012-38367 A | 2/2012 |
| JP | 2012-43495 A | 3/2012 |
| JP | 2012-203955 A | 10/2012 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |

OTHER PUBLICATIONS

Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Communication dated Aug. 23, 2018 from the United States Patent and Trademark Office in U.S. Appl. No. 15/614,876.
Communication dated Aug. 23, 2018 from the United States Patent and Trademark Office in U.S. Appl. No. 15/621,464.
Communication dated Aug. 23, 2018 from the United States Patent and Trademark Office in U.S. Appl. No. 15/626,720.
Communication dated Aug. 24, 2018 from the United States Patent and Trademark Office in U.S. Appl. No. 15/620,916.
Communication dated Aug. 3, 2018 from the United States Patent and Trademark Office in U.S. Appl. No. 15/380,336.
Communication dated Dec. 5, 2016 from the United States Patent and Trademark Office in U.S. Appl. No. 14/978,834.
Communication dated Dec. 6, 2016 from the United States Patent and Trademark Office in U.S. Appl. No. 14/757,555.
Communication dated Jun. 9, 2017 which issued during the prosecution of U.S. Appl. No. 15/388,864.
Communication dated May 30, 2018 which issued during the prosecution of U.S. Appl. No. 15/388,911.
Communication dated Nov. 18, 2016 which issued during the prosecution of U.S. Appl. No. 14/753,227.
Office Action dated Aug. 15, 2016 which issued during the prosecution of U.S. Appl. No. 14/753,227.
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.

(56) References Cited

OTHER PUBLICATIONS

Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Feb. 21, 2019 in U.S. Appl. No. 15/854,383.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Office Action dated Nov. 19, 2018 in U.S. Appl. No. 15/900,141.
Notice of Allowance dated Jun. 28, 2017, which issued during the prosecution of U.S. Appl. No. 15/464,991.
Office Action dated Mar. 5, 2019 in U.S. Appl. No. 15/443,026.
Notice of Allowance dated Mar. 5, 2019 in U.S. Appl. No. 16/009,603.
Office Action dated Feb. 28, 2019 in U.S. Appl. No. 15/920,518.
Office Action dated Mar. 6, 2019 in U.S. Appl. No. 15/854,403.
"Introduction to TMR Magnetic Sensors", Anonymous, Mar. 12, 2015, MR Sensor Technology, pp. 1-5 (Year: 2015).
Office Action dated Feb. 26, 2019 in Japanese Application No. 2016-123207.
Office Action dated May 4, 2018 which issued during the prosecution of U.S. Appl. No. 15/422,821.
Notice of Allowance dated Aug. 28, 2018 from the US Patent & Trademark Office in U.S. Appl. No. 15/422,821.
Office Action dated Nov. 29, 2018, which issued during the prosecution of U.S. Appl. No. 15/422,821.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.

(56) References Cited

OTHER PUBLICATIONS

Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 7, 2019 in U.S. Appl. No. 15/854,439.
Office Action dated Mar. 27, 2019 in U.S. Appl. No. 15/690,400.
Notice of Allowance dated Apr. 16, 2019 in U.S. Appl. No. 15/625,428.
Office Action dated Apr. 15, 2019 in U.S. Appl. No. 16/182,083.
Office Action dated Apr. 16, 2019 in U.S. Appl. No. 16/232,165.
Notice of Allowance dated Apr. 30, 2019 in U.S. Appl. No. 15/380,309.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 23, 2019 in Japanese Application No. 2016-169851.
Office Action dated Apr. 23, 2019 in Japanese Application No. 2016-182230.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
Notice of Allowance dated Jun. 25, 2019 in U.S. Appl. No. 15/620,916.
Office Action dated Jun. 25, 2019 in Japanese Application No. 2015-245144.
Notice of Allowance dated Jun. 27, 2019 in U.S. Appl. No. 15/854,439.

* cited by examiner

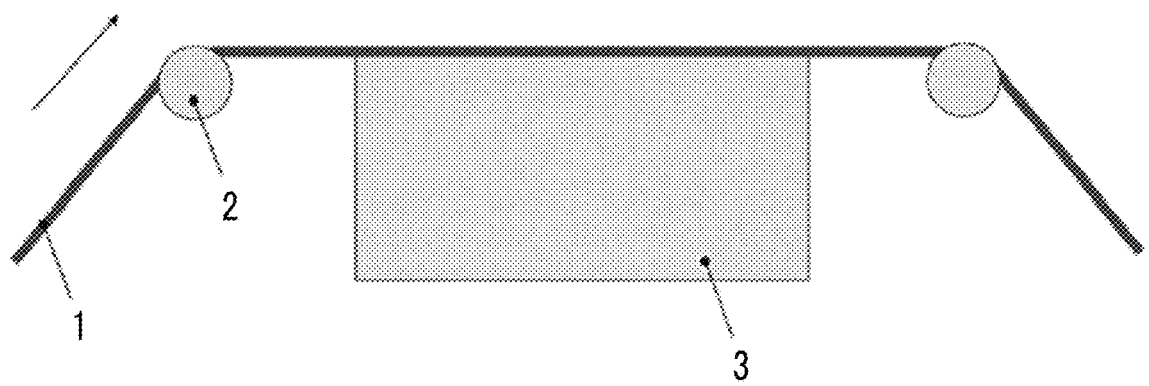

MAGNETIC TAPE DEVICE AND MAGNETIC REPRODUCING METHOD

CROSS-REFERENCE TO RELATED APPLICATIONS

This application claims priority under 35 U.S.C 119 to Japanese Patent Application No. 2017-065523 filed on Mar. 29, 2017. The above application is hereby expressly incorporated by reference, in its entirety, into the present application.

BACKGROUND OF THE INVENTION

1. Field of the Invention

The present invention relates to a magnetic tape device and a magnetic reproducing method.

2. Description of the Related Art

Magnetic recording is used as a method of recording information on a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head in the magnetic disk device. On the other hand, the usage of the TMR head in the magnetic tape device is still currently in a stage where the further use thereof is expected. The reason why the usage thereof is not yet practically realized is because it is not necessary that a reproducing head used in the magnetic tape device have sensitivity improved enough for using the TMR head. Nevertheless, in a case where the TMR head can be used as the reproducing head even in the magnetic tape device, it is possible to deal with higher-density recording of a magnetic tape in the future.

In the magnetic tape device, it is also desired that information recorded on the magnetic tape is reproduced at a high signal-to-noise-ratio (SNR). However, as recording density increases, the SNR tends to decrease.

Therefore, an object of the invention is to provide a magnetic tape device in which a TMR head is mounted as a reproducing head and information recorded on a magnetic tape can be reproduced at a high SNR.

As methods of increasing the SNR at the time of reproducing information recorded on the magnetic tape, a method of increasing smoothness of a surface of a magnetic layer of a magnetic tape is used. The inventors have made intensive studies for realizing a higher SNR, by using other methods, in addition to the method of increasing smoothness of a surface of a magnetic layer of a magnetic tape.

Meanwhile, a magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. It is said that a resistance value in the TMR head is generally high, as disclosed in a paragraph 0007 of JP2004-185676A, but generation of a significant decrease in resistance value in the TMR head, while continuing the reproducing of information with the TMR head, may cause a decrease in reproduction output over time with respect to an initial stage of the reproduction.

During intensive studies for achieving the object described above, the inventors have found a phenomenon which was not known in the related art, in that, in a case of using the TMR head as a reproducing head in the magnetic tape device, a significant decrease in resistance value (electric resistance) occurs in the TMR head. A decrease in resistance value in the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of reproducing information by using the TMR head as a reproducing head was not even confirmed in the related art. A difference in the recording and reproducing system between the magnetic disk device and the magnetic tape device, specifically, contact and non-contact between a magnetic recording medium and a magnetic head at the time of the reproducing may be the reason why a significant decrease in resistance value in the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads. It is clear that, a significant decrease in resistance value in the TMR head tends to more significantly occur in a magnetic tape device in which a magnetic tape having high smoothness of a surface of a magnetic layer is mounted as the magnetic tape. With respect to this, as a result of more intensive studies after finding the phenomenon described above, the inventors have newly found that such a significant decrease in resistance value can be prevented by using a magnetic tape described below as the magnetic tape.

One aspect of the invention has been completed based on the finding described above.

According to one aspect of the invention, there is provided a magnetic tape device comprising: a magnetic tape; and a reproducing head, in which the reproducing head is a magnetic head (hereinafter, also referred to as a "TMR head") including a tunnel magnetoresistance effect type element (hereinafter, also referred to as a "TMR element") as a reproducing element, the magnetic tape includes a non-magnetic support, and a magnetic layer including ferromagnetic powder, a binding agent, and fatty acid ester on the non-magnetic support, a center line average surface roughness Ra measured regarding a surface of the magnetic layer (hereinafter, also referred to as a "magnetic layer surface roughness Ra") is equal to or smaller than 2.0 nm, a full width at half maximum of spacing distribution measured by optical interferometry regarding the surface of the magnetic layer before performing a vacuum heating with respect to the magnetic tape (hereinafter, also referred to as "FWHM$_{before}$") is greater than 0 nm and equal to or smaller than 7.0 nm, a full width at half maximum of spacing distribution measured by optical interferometry regarding the surface of the magnetic layer after performing the vacuum heating with respect to the magnetic tape (hereinafter, also referred to as "FWHM$_{after}$") is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape (hereinafter, also simply referred to as a "difference ($S_{after}-S_{before}$)") is greater than 0 nm and equal to or smaller than 8.0 nm, and a ratio (Sdc/Sac; hereinafter, also referred to as a "magnetic cluster area ratio Sdc/Sac") of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

According to another aspect of the invention, there is provided a magnetic reproducing method comprising: reproducing information recorded on a magnetic tape by a reproducing head, in which the reproducing head is a magnetic head including a tunnel magnetoresistance effect type element as a reproducing element, the magnetic tape includes a non-magnetic support, and a magnetic layer including ferromagnetic powder, a binding agent, and fatty acid ester on the non-magnetic support, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and a ratio (Sdc/Sac) of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

In the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours.

In the invention and the specification, the spacing measured by optical interferometry regarding the surface of the magnetic layer of the magnetic tape is a value measured by the following method. In the invention and the specification, the "surface of the magnetic layer" of the magnetic tape is identical to the surface of the magnetic tape on the magnetic layer side.

In a state where the magnetic tape and a transparent plate-shaped member (for example, glass plate or the like) are overlapped onto each other so that the surface of the magnetic layer of the magnetic tape faces the transparent plate-shaped member, a pressing member is pressed against the side of the magnetic tape opposite to the magnetic layer side at pressure of $5.05 \times 10^4$ N/m (0.5 atm). In this state, the surface of the magnetic layer of the magnetic tape is irradiated with light through the transparent plate-shaped member (irradiation region: 150,000 to 200,000 $\mu m^2$), and a spacing (distance) between the surface of the magnetic layer of the magnetic tape and the surface of the transparent plate-shaped member on the magnetic tape side is acquired based on intensity (for example, contrast of interference fringe image) of interference light generated due to a difference in a light path between reflected light from the surface of the magnetic layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or in some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be 500 to 700 nm, for example. However, the wavelength of light incident to the light reception unit is not limited to be in the range described above. In addition, the transparent plate-shaped member may be a member having transparency through which emitted light passes, to the extent that the magnetic tape is irradiated with light through this member and interference light is obtained.

The measurement described above can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

In addition, the full width at half maximum of spacing distribution of the invention and the specification is a full width at half maximum (FWHM), in a case where the interference fringe image obtained by the measurement of the spacing described above is divided into 300,000 points, a spacing of each point (distance between the surface of the magnetic layer of the magnetic tape and the surface of the transparent plate-shaped member on the magnetic tape side) is acquired, this spacing is shown with a histogram, and this histogram is fit with Gaussian distribution.

Further, the difference ($S_{after}-S_{before}$) is a value obtained by subtracting a mode before the vacuum heating from a mode after the vacuum heating of the 300,000 points.

One aspect of the magnetic tape device and the magnetic reproducing method is as follows.

In one aspect, the $FWHM_{before}$ is 3.0 nm to 7.0 nm.
In one aspect, the FWHM after is 3.0 nm to 7.0 nm.
In one aspect, the difference ($S_{after}-S_{before}$) is 2.0 nm to 8.0 nm.
In one aspect, the center line average surface roughness Ra measured regarding the surface of the magnetic layer is 1.2 nm to 2.0 nm.
In one aspect, the magnetic tape includes a non-magnetic layer including non-magnetic powder and a binding agent between the non-magnetic support and the magnetic layer.

According to one aspect of the invention, in a case of reproducing information recorded on the magnetic tape with the TMR head, it is possible to perform the reproduction at a high SNR and prevent occurrence of a significant decrease in resistance value in the TMR head.

BRIEF DESCRIPTION OF THE DRAWING

FIG. 1 is a schematic configuration diagram of a vibration imparting device used in examples.

DESCRIPTION OF THE PREFERRED EMBODIMENTS

Magnetic Tape Device

One aspect of the invention relates to a magnetic tape device including: a magnetic tape; and a reproducing head, in which the reproducing head is a magnetic head including a tunnel magnetoresistance effect type element as a reproducing element, the magnetic tape includes a non-magnetic support, and a magnetic layer including ferromagnetic powder, a binding agent, and fatty acid ester on the non-magnetic support, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape ($FWHM_{before}$) is greater than 0 nm and equal to or smaller than 7.0 nm, a full width at half maximum of spacing distribution measured by optical interferometry regarding the surface of the magnetic layer after performing the vacuum heating with respect to the magnetic tape ($FWHM_{after}$) is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and a ratio (Sdc/Sac) of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

The inventors have thought that the magnetic layer surface roughness Ra and the magnetic cluster area ratio Sdc/Sac set to be in the ranges described above contribute to the reproducing of information recorded on the magnetic tape in the magnetic tape device at a high SNR, and the $FWHM_{before}$, the $FWHM_{after}$, and the difference ($S_{after}-S_{before}$) set to be in the range described above contribute to the prevention of a significant decrease in resistance value in the TMR head.

The magnetic layer surface roughness Ra equal to or smaller than 2.0 nm can contribute to a decrease in spacing loss causing a decrease in SNR. In addition, the magnetic cluster area ratio Sdc/Sac of 0.80 to 1.30 also contribute to improvement of the SNR. It is thought that magnetic cluster area ratio Sdc/Sac is a value which may be an index for a state of ferromagnetic powder present in the magnetic layer. It is surmised that, a state in which the magnetic cluster area ratio Sdc/Sac is 0.80 to 1.30 is a state in which aggregation of particles of ferromagnetic powder is prevented in the magnetic layer, and such a state contributes to the reproducing of information recorded on the magnetic tape at a high SNR, thereby reproducing even information recorded at high density at a high SNR.

The above description is a surmise of the inventors regarding the reproduction of information recorded on the magnetic tape at a high SNR, in the magnetic tape device. The inventors have thought regarding the usage of the TMR head by preventing the occurrence of a significant decrease in resistance value, in the magnetic tape.

In the magnetic tape device, in a case of using a magnetic tape of the related art, in a case of using a TMR head as a reproducing head, a phenomenon in which a resistance value (electric resistance) significantly decreases in the TMR head occurs. This phenomenon is a phenomenon that has been newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, information recorded on the magnetic tape can be reproduced.

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reproducing information recorded on the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reproducing information recorded on the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurring even at one portion between the two electrodes as described above is a phenomenon which does not occur in other MR heads. In the magnetic disk device using a levitation type recording and reproducing system, a magnetic disk and a reproducing head do not come into contact with each other at the time of reproducing, and thus, damage causing short circuit hardly occurs. On the other hand, in the magnetic tape device using a sliding type recording and reproducing system, in a case where any measures are not prepared, the TMR head is damaged due to the sliding between the TMR head and the magnetic tape, and thus, short circuit easily occurs. The inventors have assumed that this is the reason why a decrease in resistance value of the TMR head occurs particularly significantly at the time of reproducing, in a case of using the TMR head as a reproducing head in the magnetic tape device. In addition, it is thought that, in a case where the smoothness of the surface of the magnetic layer of the magnetic tape increases, a contact area (so-called real contact area) between the surface of the magnetic layer and the reproducing head increases. It is thought that the reproducing head which is more easily damaged at the time of sliding on the magnetic tape due to an increase in contact area, is a reason of a decrease in resistance value in the TMR head which tends to be significant, in the magnetic tape device in which the magnetic tape having high smoothness of the surface of the magnetic layer is mounted.

With respect to this, as a result of intensive studies of the inventors, the inventors have newly found that it is possible to prevent a phenomenon in which a decrease in resistance value of the TMR head occurs significantly at the time of reproducing, in a case of using the TMR head as a reproducing head in the magnetic tape device, by using the magnetic tape in which the $FWHM_{before}$, the $FWHM_{after}$, and the difference ($S_{after}-S_{before}$) are in the ranges described above. The surmise of the inventors regarding this point is as described in the following (1) and (2).

(1) A portion (projection) which mainly comes into contact (so-called real contact) with the reproducing head in a case where the magnetic tape and the reproducing head slide on each other, and a portion (hereinafter, referred to as a "base portion") having a height lower than that of the portion described above are normally present on the surface of the magnetic layer. The inventors have thought that the spacing described above is a value which is an index of a distance between the reproducing head and the base portion in a case where the magnetic tape and the reproducing head slide on each other. However, it is thought that, in a case where a lubricant included on the magnetic layer forms a liquid film on the surface of the magnetic layer, the liquid film is present between the base portion and the reproducing head, and thus, the spacing is narrowed by the thickness of the liquid film.

Meanwhile, the lubricant is generally divided broadly into a liquid lubricant and a boundary lubricant. Fatty acid ester included in the magnetic layer of the magnetic tape is known as a component which can function as a liquid lubricant. It is considered that a liquid lubricant can protect the surface of the magnetic layer by forming a liquid film on the surface of the magnetic layer. The inventors have thought that the presence of the liquid film of fatty acid ester on the surface of the magnetic layer contributes to the smooth sliding (improvement of sliding properties) between the magnetic tape and the reproducing head (TMR head). However, an excessive amount of fatty acid ester present on the surface of the magnetic layer causes sticking due to the formation of a meniscus (liquid crosslinking) between the surface of the magnetic layer and the reproducing head due to fatty acid ester, thereby decreasing sliding properties.

In regards to this point, the inventors focused on the idea that fatty acid ester is a component having properties of volatilizing by vacuum heating, and the difference ($S_{after}-S_{before}$) of a spacing between a state after the vacuum heating (state in which a liquid film of fatty acid ester is volatilized and removed) and a state before the vacuum heating (state in which the liquid film of fatty acid ester is present) was used as an index of a thickness of the liquid film formed of fatty acid ester on the surface of the magnetic layer. The inventors have surmised that the presence of the liquid film of fatty acid ester on the surface of the magnetic layer, so that the value of the difference is greater than 0 nm and equal to or smaller than 8.0 nm, causes the improvement of sliding properties between the reproducing head (TMR head) and the magnetic tape while preventing sticking.

(2) A smaller value of the full width at half maximum of spacing distribution means that a variation in the values of the spacing measured on each part of the surface of the magnetic layer is small. As a result of the intensive studies, the inventors found that it is effective to increase uniformity of a contact state between the surface of the magnetic layer and the reproducing head by increasing uniformity of a height of projection present on the surface of the magnetic layer and increasing uniformity of a thickness of a liquid film of fatty acid ester, in order to realize smooth sliding between the magnetic tape and the reproducing head.

In regards to this point, it is considered that the reason for the variation in values of the spacing is a variation in height of the projection of the surface of the magnetic layer and a variation in the thickness of the liquid film fatty acid ester. The inventors have surmised that the full width at half maximum of the spacing distribution $FWHM_{before}$ measured before the vacuum heating, that is, in a state where the liquid film of fatty acid ester is present on the surface of the magnetic layer, becomes great, as the variation in height of the projection and the variation in the thickness of the liquid film of fatty acid ester are great. Particularly, the spacing distribution $FWHM_{before}$ is greatly affected by the variation in the thickness of the liquid film of fatty acid ester. In contrast, the inventors have surmised that the full width at half maximum of the spacing distribution $FWHM_{after}$ measured after the vacuum heating, that is, in a state where the liquid film of fatty acid ester is removed from the surface of the magnetic layer, becomes great, as the variation in height of the projection is great. That is, the inventors have surmised that small full widths at half maximum of spacing distributions $FWHM_{before}$ and $FWHM_{after}$ mean a small variation in the thickness of the liquid film of fatty acid ester on the surface of the magnetic layer and a small variation in height of the projection. It is thought that an increase in uniformity of the height of the projection and the thickness of the liquid film of fatty acid ester so that the full widths at half maximum of the spacing distribution $FWHM_{before}$ and $FWHM_{after}$ are greater than 0 nm and equal to or smaller than 7.0 nm contributes to smooth sliding between the magnetic tape and the TMR head. As a result, the inventors have surmised that it is possible to prevent occurrence of short circuit due to damage on the TMR head due to the sliding on the magnetic tape having the magnetic layer surface roughness Ra of 2.0 nm and excellent smoothness of the surface of the magnetic layer.

However, the above descriptions are merely a surmise of the inventors and the invention is not limited thereto.

Hereinafter, the magnetic tape device will be described more specifically. A "decrease in resistance value of the TMR head" described below is a significant decrease in resistance value of the TMR head occurring in a case of reproducing information recorded on magnetic tape by the TMR head, in the magnetic tape device in which the TMR head is mounted as the reproducing head, otherwise not noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

Magnetic Tape

Magnetic Layer Surface Roughness Ra

The center line average surface roughness Ra measured regarding the surface of the magnetic layer of the magnetic tape (magnetic layer surface roughness Ra) is equal to or smaller than 2.0 nm. This point can contribute to the reproducing of the information recorded on the magnetic tape at high density and a high SNR in the magnetic tape device. From a viewpoint of further increasing the SNR, the magnetic layer surface roughness Ra is preferably equal to or smaller than 1.9 nm, more preferably equal to or smaller than 1.8 nm, even more preferably equal to or smaller than 1.7 nm, still preferably equal to or smaller than 1.6 nm, and still more preferably equal to or smaller than 1.5 nm. In addition, the magnetic layer surface roughness Ra can be, for example, equal to or greater than 1.0 nm or equal to or greater than 1.2 nm. However, from a viewpoint of increasing the SNR in a case of reproducing information recorded on the magnetic tape at high density, a low magnetic layer surface roughness Ra is preferable, and thus, the magnetic layer surface roughness Ra may be lower than the lower limit exemplified above.

The center line average surface roughness Ra measured regarding the surface of the magnetic layer of the magnetic tape in the invention and the specification is a value measured with an atomic force microscope (AFM) in a region having an area of 40 μm×40 μm of the surface of the magnetic layer. As an example of the measurement conditions, the following measurement conditions can be used. The magnetic layer surface roughness Ra shown in examples which will be described later is a value obtained by the measurement under the following measurement conditions.

The measurement is performed regarding the region of 40 μm×40 μm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 μm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain the magnetic tape having the magnetic layer surface roughness Ra equal to or smaller than 2.0 nm.

Full Width at Half Maximum of Spacing Distribution $FWHM_{before}$ and $FWHM_{after}$ Both of the full width at half maximum of spacing distribution $FWHM_{before}$ before the vacuum heating and the full width at half maximum of spacing distribution $FWHM_{after}$ after the vacuum heating which are measured in the magnetic tape are greater than 0 nm and equal to or smaller than 7.0 nm. The inventors have surmised that this point contributes to the prevention of a decrease in resistance value of the TMR head. From a viewpoint of further preventing a decrease in resistance value of the TMR head, the $FWHM_{before}$ and the $FWHM_{after}$ are preferably equal to or smaller than 6.5 nm, more preferably equal to or smaller than 6.0 nm, even more preferably equal to or smaller than 5.5 nm, still more preferably equal to or smaller than 5.0 nm, and still even more preferably equal to or smaller than 4.5 nm. The $FWHM_{before}$ and the $FWHM_{after}$ can be, for example, equal to or greater than 0.5 nm, equal to or greater than 1.0 nm, equal to or greater than 2.0 nm, or equal to or greater than 3.0 nm. Meanwhile, from a viewpoint of preventing a decrease in resistance value of the TMR head, it is preferable that the values thereof are small, and therefore, the values thereof may be smaller than the exemplified values.

The full width at half maximum of spacing distribution $FWHM_{before}$ before the vacuum heating can be decreased mainly by decreasing the variation in the thickness of the liquid film of fatty acid ester. An example of a specific method will be described later. Meanwhile, the full width at half maximum of spacing distribution $FWHM_{after}$ after the vacuum heating can be decreased by decreasing the variation in height of the projection of the surface of the magnetic layer. In order to realize the decrease described above, it is preferable that a presence state of the powder component included in the magnetic layer, for example, non-magnetic filler, which will be described later specifically, in the magnetic layer is controlled. An example of a specific method will be described later.

Difference ($S_{after}-S_{before}$)

The difference ($S_{after}-S_{before}$) of the spacings before and after the vacuum heating measured in the magnetic tape is greater than 0 nm and equal to or smaller than 8.0 nm. The inventors have surmised that this point also contributes to the prevention of a decrease in resistance value of the TMR head. From a viewpoint of further preventing a decrease in resistance value of the TMR head, the difference ($S_{after}-S_{before}$) is preferably equal to or greater than 0.1 nm, more preferably equal to or greater than 1.0 nm, even more preferably equal to or greater than 1.5 nm, still more preferably equal to or greater than 2.0 nm, and still even more preferably equal to or greater than 2.5 nm. Meanwhile, from a viewpoint of further preventing a decrease in resistance value of the TMR head, the difference ($S_{after}-S_{before}$) is preferably equal to or smaller than 7.5 nm, more preferably equal to or smaller than 7.0 nm, even more preferably equal to or smaller than 6.5 nm, still preferably equal to or smaller than 6.0 nm, still more preferably equal to or smaller than 5.5 nm, still even more preferably equal to or smaller than 5.0 nm, still furthermore preferably equal to or smaller than 4.5 nm, and still even furthermore preferably equal to or smaller than 4.0 nm. The difference ($S_{after}-S_{before}$) can be controlled by the amount of fatty acid ester added to a magnetic layer forming composition. In addition, regarding the magnetic tape including a non-magnetic layer between the non-magnetic support and the magnetic layer, the difference ($S_{after}-S_{before}$) can also be controlled by the amount of fatty acid ester added to a non-magnetic layer forming composition. This is because that the non-magnetic layer can play a role of holding a lubricant and supplying the lubricant to the magnetic layer, and fatty acid ester included in the non-magnetic layer may be moved to the magnetic layer and present in the surface of the magnetic layer.

Magnetic Cluster Area Ratio Sdc/Sac

The magnetic cluster area ratio Sdc/Sac of the magnetic tape is 0.80 to 1.30. It is thought that the magnetic cluster area ratio Sdc/Sac is a value which may be an index showing a state of ferromagnetic powder present in the magnetic layer. Specifically, in the magnetic layer of the magnetic tape in the AC demagnetization state, each ferromagnetic particle faces a random direction and the total amount of magnetization is close to zero. Accordingly, each ferromagnetic particle can be substantially present in a state of a primary particle. Thus, a size of the magnetic cluster in the AC demagnetization state (specifically, average area Sac which will be described later in detail) can be a value which does not vary depending on an aggregation state of ferromagnetic particles of the magnetic layer. Meanwhile, a size of the magnetic cluster in the DC demagnetization (a degree of a magnetic field was set as zero, after applying DC magnetic field) state (specifically, average area Sdc which will be described later in detail) corresponds to a size of an aggregate of the ferromagnetic particles and varies depending on a degree of aggregation of the ferromagnetic particles in the magnetic layer. As the ferromagnetic particles are aggregated, the value thereof tends to increase. Therefore, it is thought that a small difference between the Sdc and Sac means that the aggregation of the particles of the ferromagnetic powder is prevented. For details of this point, a description disclosed in paragraphs 0014 to 0017 of JP2007-294084A can be referred to, for example. It is thought that the magnetic cluster area ratio Sdc/Sac which is 0.80 to 1.30 contributes to an increase in SNR at the time of reproducing information recorded on the magnetic tape by the TMR head, thereby reproducing even information recorded at high density at a high SNR. From a viewpoint of further increasing the SNR, the magnetic cluster area ratio Sdc/Sac is preferably equal to or smaller than 1.28, more preferably equal to or smaller than 1.25, even more preferably equal to or smaller than 1.20, still preferably equal to or smaller than 1.15, still more preferably equal to or smaller than 1.10, still even more preferably equal to or smaller than 1.05, and still furthermore preferably equal to or smaller than 1.00. A lower limit of the measurement value of the magnetic cluster area ratio Sdc/Sac is 0.80 as known in the related art (for example, see a paragraph 0018 of JP2007-294084A).

The magnetic cluster area ratio Sdc/Sac of the invention and the specification is a value obtained by the following method by measurement performed using a magnetic force microscope (MFM).

Two samples cut out from the same magnetic tape are prepared. One sample is used for measuring the Sac by performing the AC demagnetization and the other sample is used for measuring the Sdc by allowing the DC demagnetization.

The Sac is a value obtained by the following method.

With a magnetic force microscope, a magnetic force image is obtained in a square area having a length of a side of 5 μm (5 μm×5 μm) of a surface of a magnetic layer of the sample regarding which demagnetization is performed in the alternating magnetic field (alternating current (AC) demagnetization). An area of the magnetic force image is calculated after performing noise removing and hole filling treatment regarding the obtained magnetic force image, by using well-known image analysis software. The above operation is performed with respect to magnetic force images of arbitrarily selected 10 different points of the surface of the magnetic layer, and an arithmetical mean (average area) of the areas of the magnetic force image is calculated. The average area calculated as described above is set as the Sac.

The Sdc is a value obtained by the following method.

The sample was subjected to direct current (DC) demagnetization at applying magnetic field of 796 kA/m (10 kOe), and then, a magnetic force image having a square area having a length of a side of 5 μm (5 μm×5 μm) of the sample subjected to the DC demagnetization is obtained by using a magnetic force microscope. An area of the magnetic force image is calculated after performing noise removing and hole filling treatment regarding the obtained magnetic force image, by using well-known image analysis software. The above operation is performed with respect to magnetic force images of arbitrarily selected 10 different points of the surface of the magnetic layer, and an arithmetical mean (average area) of the areas of the magnetic force image is calculated. The average area calculated as described above is set as the Sdc.

The ratio (Sdc/Sac) of the Sdc and Sac obtained as described above is set as the magnetic cluster area ratio Sdc/Sac.

The obtaining of the magnetic force image with a magnetic force microscope is performed by using a commercially available magnetic force microscope or a magnetic force microscope having a well-known configuration in a frequency modulation (FM) mode. As a probe of the magnetic force microscope, SSS-MFMR (nominal radius of curvature of 15 nm) manufactured by NanoWorld AG can be used, for example. A distance between the surface of the magnetic layer and a distal end of the probe at the time of the magnetic force microscope observation is 20 to 50 nm. In addition, commercially available analysis software or analysis software using a well-known arithmetic expression can be used as the image analysis software.

The magnetic cluster area ratio Sdc/Sac can be controlled to be 0.80 to 1.30 by preventing the aggregation of the ferromagnetic particles of the magnetic layer. As a method for preventing the aggregation, the following method can be used, for example.

As a binding agent included in the magnetic layer, a binding agent having high affinity with a solvent used in preparation of a magnetic layer forming composition is used.

Dispersion conditions at the time of preparing the magnetic layer forming composition are adjusted.

A process for crushing aggregation of ferromagnetic particles is performed after arbitrarily applying the magnetic layer forming composition onto the non-magnetic support through a non-magnetic layer.

For the above point and other controlling methods, descriptions disclosed in paragraphs 0012 and 0032 and examples of JP4001532B, and paragraphs 0024 to 0026, 0028, 0029, 0105, and 0106, and examples of JP2007-294084A can be referred to, for example.

In addition, regarding ferromagnetic powder having low saturation magnetization as, ferromagnetic particles configuring the ferromagnetic powder are hardly aggregated, and even in a case where the ferromagnetic particles are aggregated, the aggregation tends to be easily crushed. Accordingly, a method of forming a magnetic layer by using ferromagnetic powder having low saturation magnetization as can be a method of controlling the magnetic cluster area ratio Sdc/Sac.

For example, the magnetic cluster area ratio Sdc/Sac can be controlled to be 0.80 to 1.30 by arbitrarily combining one or two or more various methods described above.

In one aspect, the Sdc and Sac are respectively preferably 3,000 to 50,000 nm$^2$, more preferably 3,000 to 35,000 nm$^2$, and even more preferably 3,000 to 20,000 nm$^2$. The Sdc and Sac are respectively preferably equal to or greater than 3,000 nm$^2$, from a viewpoint of stability of magnetization, and are respectively preferably equal to or smaller than 50,000 nm$^2$, from a viewpoint of increasing resolution at the time of high-density recording. The Sac can be controlled by using the average particle size of the ferromagnetic powder used for forming the magnetic layer, and the Sdc can be controlled by preventing aggregation of the ferromagnetic particles of the magnetic layer. The method of preventing the aggregation is as described above.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and fatty acid ester, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. In addition, as described above, it is preferable to use a binding agent having high affinity with a solvent, from a viewpoint of preventing aggregation of the ferromagnetic particles of the magnetic layer. In addition, the binding agent may be a radiation curable resin such as an electron beam-curable resin. For the radiation curable resin, descriptions disclosed in paragraphs 0044 and 0045 of JP2011-048878A can be referred to.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Fatty Acid Ester

The magnetic tape includes fatty acid ester in the magnetic layer. The fatty acid ester may be included alone as one type or two or more types thereof may be included. Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester, as the content of the magnetic layer forming composition, is, for example, 0.1 to 10.0 parts by mass and is preferably 1.0 to 7.0 parts by mass with respect to 100.0 parts by mass of ferromagnetic powder. In a case of using two or more kinds of different fatty acid esters as the fatty acid ester, the content thereof is the total content thereof. In the invention and the specification, the same applies to content of other components, unless otherwise noted. In addition, in the invention and the specification, a given component may be used alone or used in combination of two or more kinds thereof, unless otherwise noted.

In a case where the magnetic tape includes a non-magnetic layer between the non-magnetic support and the magnetic layer, the content of fatty acid ester in a non-magnetic layer forming composition is, for example, 0 to 10.0 parts by mass and is preferably 0.1 to 8.0 parts by mass with respect to 100.0 parts by mass of non-magnetic powder.

Other Lubricants

The magnetic tape includes fatty acid ester which is one kind of lubricants at least in the magnetic layer. The lubricants other than fatty acid ester may be arbitrarily included in the magnetic layer and/or the non-magnetic layer. As described above, the lubricant included in the non-magnetic layer may be moved to the magnetic layer and present in the surface of the magnetic layer. As the lubricant which may be arbitrarily included, fatty acid can be used. In addition, fatty acid amide and the like can also be used. Fatty acid ester is known as a component which can function as a liquid lubricant, whereas fatty acid and fatty acid amide are known as a component which can function as a boundary lubricant. It is considered that the boundary lubricant is a lubricant which can be adsorbed to a surface of powder (for example, ferromagnetic powder) and form a rigid lubricant film to decrease contact friction.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and examples thereof include lauric acid amide, myristic acid amide, palmitic acid amide, and stearic acid amide.

Regarding fatty acid and a derivative of fatty acid (amide and ester), a part derived from fatty acid of the fatty acid derivative preferably has a structure which is the same as or similar to that of fatty acid used in combination. As an example, in a case of using stearic acid as fatty acid, it is preferable to use stearic acid ester and/or stearic acid amide.

The content of fatty acid in the magnetic layer forming composition is, for example, 0 to 10.0 parts by mass, preferably 0.1 to 10.0 parts by mass, and more preferably 1.0 to 7.0 parts by mass, with respect to 100.0 parts by mass of the ferromagnetic powder. The content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of the ferromagnetic powder.

In a case where the magnetic tape includes a non-magnetic layer between the non-magnetic support and the magnetic layer, the content of fatty acid in the non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid amide in the non-magnetic layer forming composition is, for example, 0 to 3.0 parts by mass and preferably 0 to 1.0 part by mass with respect to 100.0 parts by mass of the non-magnetic powder.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a dispersing agent, a dispersing assistant, an antibacterial agent, an antistatic agent, and an antioxidant. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the magnetic layer surface roughness Ra.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.00 to 6.00 μm.

A thickness of the magnetic layer is preferably equal to or smaller than 0.15 μm and more preferably equal to or smaller than 0.10 from a viewpoint of realization of high-density recording required in recent years. The thickness of the magnetic layer is even more preferably 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.10 to 1.50 μm and is preferably 0.10 to 1.00 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.80 μm, more preferably equal to or smaller than 1.50 μm, and even more preferably equal to or smaller than 1.10 μm, from a viewpoint of thinning the magnetic tape. In addition, the total thickness of the magnetic layer and the non-magnetic layer can be, for example, equal to or greater than 0.10 μm.

A thickness of the back coating layer is preferably equal to or smaller than 0.90 μm and even more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-1101-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm can be used, for example. In addition, as described above, it is also preferable that the dispersion conditions for controlling the magnetic cluster area ratio Sdc/Sac are adjusted. An increase in dispersion time, a decrease in diameter of dispersion beads used in the dispersion, an increase in filling percentage of the dispersion beads, and the like are preferable, from a viewpoint of preventing aggregation of the ferromagnetic particles of the magnetic layer.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. In the aspect of performing the orientation process, while the coating layer of the magnetic layer forming composition is wet, an orientation process is performed with respect to the coating layer in an orientation zone. For the orientation process, a description disclosed in a paragraph 0052 of JP2010-24113A can be referred to. In addition, in one aspect, a process for preventing the aggregation of the ferromagnetic particles included in the coating layer can be performed before and/or after the orientation process. As an example of such a process, a smoothing process can be used. The smoothing process is a process of applying shear to the coating layer by a smoother.

The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to.

One Aspect of Preferred Manufacturing Method

As a preferred manufacturing method of the magnetic tape, a manufacturing method of applying vibration to the magnetic layer can be used, in order to improve uniformity of the thickness of the liquid film of fatty acid ester on the surface of the magnetic layer. The inventors have surmised that, by adding vibration, the liquid film of fatty acid ester on the surface of the magnetic layer flows and the uniformity of the thickness of the liquid film is improved.

That is, the magnetic tape can be manufactured by a manufacturing method of forming the magnetic layer by applying the magnetic layer forming composition including ferromagnetic powder, a binding agent, and fatty acid ester on the non-magnetic support and drying to form a magnetic layer, and applying vibration to the formed magnetic layer. The manufacturing method is identical to the typical manufacturing method of the magnetic tape, except for applying vibration to the magnetic layer, and the details thereof are as described above.

Means for applying vibration are not particularly limited. For example, the vibration can be applied to the magnetic layer, by bringing the surface of the non-magnetic support, provided with the magnetic layer formed, on a side opposite to the magnetic layer to come into contact with a vibration imparting unit. The non-magnetic support, provided with the magnetic layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the magnetic layer by a vibration frequency, and strength of the ultrasonic vibrator, and/or the contact time with the vibration imparting unit. For example, the contact time can be adjusted by a running speed of the non-magnetic support, provided with the magnetic layer formed, while coming into contact with the vibration imparting unit. The vibration imparting conditions are not particularly limited, and may be set so as to control the full width at half maximum of the spacing distribution, particularly, the full width at half maximum of the spacing distribution $FWHM_{before}$ before vacuum heating. In order to set the vibration imparting conditions, a preliminary experiment can be performed before the actual manufacturing, and the conditions can be optimized.

In addition, the full width at half maximum of the spacing distribution $FWHM_{after}$ after the vacuum heating tends to be decreased, in a case where the dispersion conditions of the magnetic layer forming composition are reinforced (for example, the number of times of the dispersion is increased, the dispersion time is extended, and the like), and/or the filtering conditions are reinforced (for example, a filter having a small hole diameter is used as a filter used in the filtering, the number of times of the filtering is increased, and the like). The inventors have surmised that this is because the uniformity of the height of the projection present on the surface of the magnetic layer is improved, by improving dispersibility and/or the uniformity of the particle size of the particulate matter included in the magnetic layer forming composition, particularly, the non-magnetic filler which may function as the projection formation agent described above. A preliminary experiment can be performed before the actual manufacturing, and the dispersion conditions and/or the filtering conditions can be optimized.

In addition, in the magnetic tape including the magnetic layer including carbon black, it is effective to use the dispersing agent for improving dispersibility of the carbon black as a magnetic layer component, in order to decrease the full width at half maximum of the spacing distribution $FWHM_{after}$ after the vacuum heating. For example, organic tertiary amine can be used as a dispersing agent of carbon black. For details of the organic tertiary amine, descriptions disclosed in paragraphs 0011 to 0018 and 0021 of JP2013-049832A can be referred to. The organic tertiary amine is more preferably trialkylamine. An alkyl group included in trialkylamine is preferably an alkyl group having 1 to 18 carbon atoms. Three alkyl groups included in trialkylamine may be the same as each other or different from each other. For details of the alkyl group, descriptions disclosed in paragraphs 0015 and 0016 of JP2013-049832A can be referred to. As trialkylamine, trioctylamine is particularly preferable.

As described above, it is possible to obtain a magnetic tape included in the magnetic tape device according to one aspect of the invention. However, the manufacturing method described above is merely an example, the magnetic cluster area ratio Sdc/Sac, the magnetic layer surface roughness Ra, the $FWHM_{before}$, the $FWHM_{after}$, and the difference ($S_{after}-S_{before}$) can be controlled to be in respective ranges described above by an arbitrary method capable of adjusting the magnetic cluster area ratio Sdc/Sac, the magnetic layer surface roughness Ra, the $FWHM_{before}$, the $FWHM_{after}$, and the difference ($S_{after}-S_{before}$), and such an aspect is also included in the invention.

A servo pattern can also be formed in the magnetic tape described above by a well-known method, in order to perform head tracking servo in the magnetic tape device. The magnetic tape is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals) to the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of the magnetic signal is performed. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Reproducing Head

The magnetic tape device includes the TMR head as the reproducing head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a reproducing element for reproducing information recorded on the magnetic tape (specifically, information recorded on the magnetic layer of the magnetic tape). By converting the detected change in resistance value into a change in voltage, the information recorded on the magnetic tape can be reproduced.

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the information recorded on the magnetic tape can be reproduced. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in resistance value (electric resistance) tends to become significant at the time of reproducing information recorded on the magnetic tape including the magnetic layer having the magnetic layer surface roughness Ra equal to or smaller than 2.0 nm. However, such a significant decrease in resistance value causes a decrease in reproduction output over time with respect to an initial stage of the reproduction. This decrease in resistance value can be prevented by setting the $FWHM_{before}$, the $FWHM_{after}$, and the difference ($S_{after}-S_{before}$) to be in the ranges described above, in the magnetic tape on which information to be reproduced is recorded and in which the magnetic layer surface roughness Ra is equal to or smaller than 2.0 nm.

In one preferred aspect, in the magnetic tape device, information recorded on the magnetic tape at linear recording density of 250 kfci can be reproduced by using the TMR head as the reproducing head. The unit, kfci, is a unit of linear recording density (not able to convert to the SI unit system). As the linear recording density increases, a magnetic signal (leakage magnetic field) obtained from the magnetic layer of the magnetic tape on which the information is recorded tends to become weak, and thus, in a case where any measures are not prepared, the SNR tends to decrease. As one reason thereof, it is thought that noise caused by the magnetic tape (so-called medium noise) significant affects the SNR, in a high linear recording density region. However, this decrease in SNR can be prevented by setting the magnetic layer surface roughness Ra and the magnetic cluster area ratio Sdc/Sac of the magnetic tape in the magnetic tape device to be in respective ranges described above. In the magnetic tape device, it is possible to perform high-sensitivity reproducing of information recorded at high linear recording density, by using the TMR head as the reproducing head. The linear recording density can be, for example, equal to or smaller than 250 kfci and also equal to or greater than 300 kfci. The linear recording density can be, for example, equal to or smaller than 800 kfci and can also exceed 800 kfci.

The reproducing head is a magnetic head including at least the TMR element as a reproducing element for reproducing information recorded on the magnetic tape. Such a magnetic head may include or may not include an element for recording information in the magnetic tape. That is, the reproducing head and the recording head may be one magnetic head or separated magnetic heads. In addition, the magnetic head including the TMR element as a reproducing element may include a servo pattern reading element for performing head tracking servo.

As the magnetic tape transportation speed of the magnetic tape device is high, it is possible to shorten a reproducing time. Meanwhile, it is desired that the magnetic tape transportation speed is decreased, in order to prevent a deterioration in recording and reproducing characteristics. From a viewpoint of preventing a deterioration in recording and reproducing characteristics, the magnetic tape transportation speed is preferably equal to or lower than 18 m/sec, more preferably equal to or lower than 15 m/sec, and even more preferably equal to or lower than 10 m/sec. The magnetic tape transportation speed can be, for example, equal to or higher than 1 m/sec.

The magnetic tape transportation speed is also referred to as a running speed, and is a relative speed between the magnetic tape and the reproducing head in a case where the magnetic tape is transported (runs) in the magnetic tape device in order to reproduce information recorded on the magnetic tape. Normally, the magnetic tape transportation speed is set in a control unit of the magnetic tape device. As the magnetic tape transportation speed is low, the time for which the same portion of the TMR head comes into contact with the magnetic tape increases at the time of reproducing, and accordingly, damage on the TMR head more easily occurs and a decrease in resistance value easily occurs. In the magnetic tape device according to one aspect of the invention, such a decrease in resistance value can be prevented by using the magnetic tape.

Magnetic Reproducing Method

One aspect of the invention relates to a magnetic reproducing method including: reproducing information recorded on a magnetic tape by a reproducing head, in which the reproducing head is a magnetic head including a tunnel magnetoresistance effect type element as a reproducing element, the magnetic tape includes a non-magnetic support, and a magnetic layer including ferromagnetic powder, a binding agent, and fatty acid ester on the non-magnetic support, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and a ratio (Sdc/Sac) of an average area Sdc of magnetic clusters of the magnetic tape in a DC demagnetization state and an average area Sac of magnetic clusters thereof in an AC demagnetization state measured with a magnetic force microscope is 0.80 to 1.30. The reproducing of the information recorded on the magnetic tape is performed by bringing the magnetic tape into contact with the reproducing head allowing sliding while transporting (causing running of) the magnetic tape. The details of the reproducing of the magnetic reproducing method and the details of the magnetic tape and the reproducing head used in the magnetic reproducing method are as the descriptions regarding the magnetic tape device according to one aspect of the invention.

According to one aspect of the invention, a magnetic tape used in a magnetic tape device in which a TMR head is used as a reproducing head, the magnetic tape including: a magnetic layer including ferromagnetic powder, a binding agent, and fatty acid ester on a non-magnetic support, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and a ratio (Sdc/Sac) of an average area Sdc of magnetic clusters of the magnetic tape in a DC demagnetization state and an average area Sac of magnetic clusters thereof in an AC demagnetization state measured with a magnetic force microscope is 0.80 to 1.30, is also provided. The details of the magnetic tape are also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

Example 1

1. Manufacturing of Magnetic Tape
(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 m²/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic powder (Ferromagnetic hexagonal ferrite powder (barium ferrite)): 100.0 parts
  Average particle size and saturation magnetization σs: see Table 1
Polyurethane resin A: see Table 1
Cyclohexanone: 150.0 parts
Methyl ethyl ketone: 150.0 parts
Abrasive Liquid
Alumina dispersion prepared in the section (1): 6.0 parts
Silica Sol
Colloidal silica: 2.0 parts
  Average particle size: see Table 1
Methyl ethyl ketone: 1.4 parts
Other Components
Butyl stearate: see Table 1
Stearic acid: 1.0 part
Polyisocyanate (CORONATE (registered trademark) L manufactured by Nippon Polyurethane Industry Co., Ltd.): 2.5 parts
Finishing Additive Solvent
Cyclohexanone: 200.0 parts
Methyl ethyl ketone: 200.0 parts (3) Non-Magnetic Layer Forming Composition List
Non-magnetic inorganic powder: α-iron oxide: 100.0 parts
  Average particle size (average long axis length): 0.15 μm
  Average acicular ratio: 7
  BET specific surface area: 52 m²/g
Carbon black: 20.0 parts
  Average particle size: 20 nm
An electron beam-curable vinyl chloride copolymer: 13.0 parts
An electron beam-curable polyurethane resin: 6.0 parts
Butyl stearate: see Table 1
Stearic acid: 1.0 part
Phenylphosphonic acid: 3.0 parts
Cyclohexanone: 300.0 parts
Methyl ethyl ketone: 300.0 parts (4) Back Coating Layer Forming Composition List
Non-magnetic inorganic powder: α-iron oxide: 80.0 parts
  Average particle size (average long axis length): 0.15 μm
  Average acicular ratio: 7
  BET specific surface area: 52 m²/g
Carbon black: 20.0 parts
  Average particle size: 20 nm
A vinyl chloride copolymer: 13.0 parts
$SO_3Na$ group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts (5) Preparation of Each Layer Forming Composition The magnetic layer forming composition was prepared by the following method.

The magnetic solution was prepared by dispersing (beads-dispersing) each component by using a batch type vertical sand mill for 24 hours. Zirconia beads having a bead diameter of 0.1 mm were used as the dispersion beads.

The prepared magnetic solution, the abrasive liquid and other components (the silica sol, the other components, and the finishing additive solvents) were introduced into a dissolver stirrer, and were stirred at a circumferential speed of 10 m/sec for 30 minutes. After that, the treatment was performed with a flow type ultrasonic dispersing device at a flow rate of 7.5 kg/min for the number of times of the passes shown in Table 1, and then, a magnetic layer forming composition was prepared by performing filtering with a filter having a hole diameter shown in Table 1, for the number of times of the passes shown in Table 1.

The non-magnetic layer forming composition was prepared by the following method. Each component excluding the lubricant (stearic acid and butyl stearate), cyclohexanone, and methyl ethyl ketone was dispersed by using a batch type vertical sand mill for 24 hours to obtain dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having a hole diameter of 0.5 µm and a non-magnetic layer forming composition was prepared.

The back coating layer forming composition was prepared by the following method. Each component excluding the lubricant (stearic acid and butyl stearate), polyisocyanate, and cyclohexanone was kneaded and diluted by an open kneader. Then, the obtained mixed solution was subjected to a dispersion process of 12 passes, with a transverse beads mill dispersing device by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1.0 µm and a back coating layer forming composition was prepared.

(6) Manufacturing Method of Magnetic Tape

The non-magnetic layer forming composition was applied onto a polyethylene naphthalate support having a thickness of 5.00 µm and dried so that the thickness after the drying becomes 1.00 µm, and then, an electron beam was emitted with an energy of 40 kGy at an acceleration voltage of 125 kV. The magnetic layer forming composition was applied so that the thickness after the drying becomes 60 nm (0.06 µm) to form a coating layer. A smoothing process was performed with respect to the coating layer while the formed coating layer is wet. The smoothing process was performed by applying shear to the coating layer using a commercially available solid smoother (center line average surface roughness catalogue value: 1.2 nm). After that, a homeotropic alignment process was performed in the orientation zone by applying a magnetic field having a magnetic field strength of 0.3 T in a vertical direction with respect to the surface of the coating layer, and the coating layer was dried.

After that, the support, provided with the coating layer formed, was installed in a vibration imparting device shown in FIG. 1 so that the surface thereof on a side opposite to the surface where the coating layer is formed comes into contact with the vibration imparting unit, and the support (in FIG. 1, reference numeral 1), provided with the coating layer formed, was transported at a transportation speed of 0.5 m/sec, to apply vibration to the coating layer. In FIG. 1, a reference numeral 2 denotes a guide roller (a reference numeral 2 denotes one of two guide rollers), a reference numeral 3 denotes the vibration imparting device (vibration imparting unit including the ultrasonic vibrator), and an arrow denotes a transportation direction. The time from the start of the contact of the arbitrary portion of the support, provided with the coating layer formed, with the vibration imparting unit until the end of the contact (vibration imparting time) is shown in Table 1 as the imparting time. The vibration imparting unit used includes an ultrasonic vibrator therein. The vibration was imparted by setting a vibration frequency and the intensity of the ultrasonic vibrator as values shown in Table 1.

After that, the back coating layer forming composition was applied onto the surface of the support on a side opposite to the surface where the non-magnetic layer and the magnetic layer are formed, and dried so that the thickness after the drying becomes thickness of 0.40 µm.

After that, the surface smoothing treatment (calender process) was performed with a calender roll configured of only a metal roll, at a calender process speed of 80 m/min, linear pressure of 300 kg/cm (294 kN/m), and a calender temperature (surface temperature of a calender roll) shown in Table 1. As the calender process conditions are reinforced (for example, as the surface temperature of the calender roll increases), the center line average surface roughness Ra measured regarding the surface of the magnetic layer tends to decrease.

Then, the thermal treatment was performed in the environment of the atmosphere temperature of 70° C. for 36 hours. After the thermal treatment, the slitting was performed so as to have a width of ½ inches (0.0127 meters), and the surface of the magnetic layer was cleaned with a tape cleaning device in which a nonwoven fabric and a razor blade are attached to a device including a sending and winding device of the slit so as to press the surface of the magnetic layer. Then, a servo pattern was formed in the magnetic layer by a commercially available servo writer.

By doing so, a magnetic tape of Example 1 was manufactured.

The thickness of each layer and the thickness of the non-magnetic support of the manufactured magnetic tape were acquired by the following method, and it was confirmed that the thicknesses obtained are the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation of physical properties described below, and the other part was used in order to measure an SNR and a resistance value of the TMR head which will be described later.

2. Evaluation of Ferromagnetic Powder (1) Average Particle Size of Ferromagnetic Powder An average particle size of the ferromagnetic powder was obtained by the method described above.

(2) Saturation Magnetization as of Ferromagnetic Powder

The saturation magnetization as of the ferromagnetic powder was measured with an applied magnetic field of 796 kA/m (10 kOe) by using an oscillation sample type magnetic-flux meter (manufactured by Toei Industry Co., Ltd.).

The evaluation was performed in Examples and Comparative Examples which will be described later in the same manner as described above.

3. Evaluation of Physical Properties of Magnetic Tape (1) Center Line Average Surface Roughness Ra Measured Regarding Surface of Magnetic Layer The measurement regarding a measurement area of 40 µm×40 µm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 vim/sec, and a resolution was set as 512 pixel×512 pixel.

(2) Full Width at Half Maximum of Spacing Distributions $FWHM_{before}$ and $FWHM_{after}$ Before and After Vacuum Heating The full width at half maximum of the spacing distributions $FWHM_{before}$ and $FWHM_{after}$ before and after vacuum heating were acquired by the following method by using a tape spacing analyzer (TSA) (manufactured by Micro Physics, Inc.).

In a state where a glass sheet included in the TSA was disposed on the surface of the magnetic layer of the magnetic tape, a hemisphere was pressed against the surface of the back coating layer of the magnetic tape at a pressure of $5.05 \times 10^4$ N/m (0.5 atm) by using a hemisphere made of urethane included in the TSA as a pressing member. In this state, a given region (150,000 to 200,000 $\mu m^2$) of the surface of the magnetic layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the magnetic layer of the magnetic tape was acquired, and the full width at half maximum of spacing distribution was full width at half maximum, in a case where this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

(3) Difference ($S_{after}-S_{before}$)

The difference ($S_{after}-S_{before}$) was a value obtained by subtracting a mode of the histogram before the vacuum heating from a mode of the histogram after the vacuum heating obtained in the section (2).

(4) Magnetic Cluster Area Ratio Sdc/Sac

The Sdc and Sac were obtained by the method described above and the magnetic cluster area ratio Sdc/Sac was calculated from the obtained values. As a magnetic force microscope, Dimension 3100 manufactured by Bruker in a frequency modulation mode was used, and as a probe, SSS-MFMR (nominal radius of curvature of 15 nm) manufactured by Nano World AG was used. A distance between the surface of the magnetic layer and a distal end of the probe at the time of the magnetic force microscope observation is 20 nm. As image analysis software, MATLAB manufactured by Math Works was used.

4. Measurement of SNR

In an environment of an atmosphere temperature of 23° C.±1° C. and relative humidity of 50%, the magnetic tape manufactured in the part 1. was attached to a reel tester having a width of ½ inches (0.0127 meters) fixed to a recording head and a reproducing head, and information was recorded and reproduced by setting a relative speed of the recording head or the reproducing head and the magnetic tape at the time of the recording and reproducing as 4 m/sec. As the recording head, a metal-in-gap (MIG) head (gap length of 0.15 µm, track width of 1.0 µm) was used, and the reproducing head, a TMR head (element width of 70 nm) commercially available as a reproducing head for HDD was used. The recording was performed at linear recording density of 300 kfci, the reproduction output at the time of reproducing was measured, and the SNR was obtained as a ratio of the reproduction output and noise. The SNR was calculated as a relative value by setting the SNR measured as 0 dB in Comparative Example 1 which will be described later. In a case where the SNR calculated as described above is equal to or greater than 7.0 dB, it is possible to evaluate that performance of dealing with future needs accompanied with high-density recording is obtained.

5. Measurement of Resistance Value of Reproducing Head

In an environment of an atmosphere temperature of 23° C.±1° C. and relative humidity of 50%, the magnetic tape manufactured in the part 1. was attached to a reel tester having a width of ½ inches (0.0127 meters) fixed to a recording head and a reproducing head, and information was recorded and reproduced. As the recording head, a MIG head (gap length of 0.15 µm, track width of 1.0 µm) was used, and the TMR head (element width of 70 nm) commercially available as a reproducing head for HDD was used as the reproducing head. A tape length of the magnetic tape was 1,000 m, and a total of 4,000 passes of the transportation (running) of the magnetic tape was performed by setting the relative speed of the magnetic tape and the magnetic head (magnetic tape transportation speed) at the time of performing reproducing as 4 m/sec. The reproducing head was moved in a width direction of the magnetic tape by 2.5 µm for 1 pass, a resistance value (electric resistance) of the reproducing head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a reproducing head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 1.

Examples 2 to 9 and Comparative Examples 1 to 13

1. Manufacturing of Magnetic Tape

A magnetic tape was manufactured in the same manner as in Example 1, except that various conditions shown in Table 1 were changed as shown in Table 1.

As the polyurethane resin A shown in Table 1, a polyurethane resin A used in examples of JP4001532B is used.

As the polyurethane resin B shown in Table 1, a polyurethane resin B used in comparative examples of JP4001532B is used.

As the vinyl chloride resin shown in Table 1, MR-110 manufactured by Zeon Corporation is used.

The polyurethane resin A is a binding agent having higher affinity with the solvent used in the preparation of the magnetic layer forming composition, compared to the polyurethane resin B and the vinyl chloride resin.

In Table 1, in the examples and the comparative examples in which "performed" is disclosed in a column of the smoothing process, the smoothing process was used in the same manner as in Example 1. In the comparative examples in which "not performed" is disclosed in a column of the smoothing process, the magnetic tape was manufactured by a manufacturing step in which the smoothing process is not performed.

In Table 1, in the comparative examples in which "none" is disclosed in a column of the ultrasonic vibration imparting conditions, a magnetic tape was manufactured by a manufacturing step in which the vibration imparting is not performed.

2. Evaluation of Physical Properties of Magnetic Tape

Various physical properties of the manufactured magnetic tape were evaluated in the same manner as in Example 1.

3. Measurement of SNR

The SNR was measured by the same method as that in Example 1, by using the manufactured magnetic tape. In Examples 2 to 9 and Comparative Examples 5 to 13, the TMR head which was the same as that in Example 1 was used as a reproducing head. In Comparative Examples 1 to 4, a commercially available spin valve type GMR head (element width of 70 nm) was used as a reproducing head.

4. Measurement of Resistance Value of Reproducing Head

A resistance value of the reproducing head was measured by the same method as that in Example 1, by using the manufactured magnetic tape. As the reproducing head, the same reproducing head (TMR head or GMR head) as the reproducing head used in the measurement of the SNR was used. In Comparative Example 10, it was difficult to continue the sliding between the magnetic tape and the reproducing head due to the sticking of the magnetic tape and the reproducing head. In Comparative Example 11, it was difficult to allow continuing the sliding between the magnetic tape and the reproducing head due to an effect of scraps generated due to chipping of the surface of the magnetic layer caused by the sliding between the magnetic tape and the reproducing head. Thus, in Comparative Examples 10 and 11, the measurement of a resistance value of the reproducing head was not performed.

In Comparative Examples 1 to 4, the GMR head used as the reproducing head was a magnetic head having a CIP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results of the evaluations described above are shown in Table 1.

TABLE 1

| | Ferromagnetic hexagonal ferrite powder | | Magnetic layer forming composition type and amount of binding agent (part) | | | | Colloidal silica | |
|---|---|---|---|---|---|---|---|---|
| | Average particle size (nm) | σs (A·m²/kg) | Polyurethane resin A | Polyurethane resin B | Vinyl chloride resin | Smoothing process | average particle size | Calender temperature |
| Comparative Example 1 | 25 | 50 | | 8.0 | 2.0 | Not performed | 120 nm | 80° C. |
| Comparative Example 2 | 25 | 50 | | 8.0 | 2.0 | Not performed | 120 nm | 90° C. |
| Comparative Example 3 | 25 | 50 | | 8.0 | 2.0 | Not performed | 80 nm | 90° C. |
| Comparative Example 4 | 25 | 50 | | 8.0 | 2.0 | Not performed | 40 nm | 110° C. |
| Comparative Example 5 | 25 | 50 | | 8.0 | 2.0 | Not performed | 120 nm | 80° C. |
| Comparative Example 6 | 25 | 50 | | 8.0 | 2.0 | Not performed | 120 nm | 90° C. |
| Comparative Example 7 | 25 | 50 | | 8.0 | 2.0 | Not performed | 80 nm | 90° C. |
| Comparative Example 8 | 25 | 50 | | 8.0 | 2.0 | Not performed | 40 nm | 110° C. |
| Comparative Example 9 | 25 | 50 | 10.0 | | | Performed | 80 nm | 90° C. |
| Comparative Example 10 | 25 | 50 | 10.0 | | | Performed | 80 nm | 90° C. |
| Comparative Example 11 | 25 | 50 | 10.0 | | | Performed | 80 nm | 90° C. |
| Comparative Example 12 | 25 | 50 | 10.0 | | | Performed | 80 nm | 90° C. |
| Comparative Example 13 | 25 | 50 | | 8.0 | 2.0 | Not performed | 80 nm | 90° C. |
| Example 1 | 25 | 50 | 10.0 | | | Performed | 80 nm | 90° C. |
| Example 2 | 25 | 50 | 11.0 | | | Performed | 80 nm | 90° C. |
| Example 3 | 25 | 50 | 12.0 | | | Performed | 80 nm | 90° C. |
| Example 4 | 25 | 50 | 15.0 | | | Performed | 80 nm | 90° C. |
| Example 5 | 27 | 50 | 10.0 | | | Performed | 80 nm | 90° C. |
| Example 6 | 20 | 43 | 13.0 | | | Performed | 80 nm | 90° C. |

TABLE 1-continued

| | | | | | | | | |
|---|---|---|---|---|---|---|---|---|
| Example 7 | 25 | 50 | 12.0 | | Performed | 80 nm | 90° C. |
| Example 8 | 25 | 50 | 12.0 | | Performed | 80 nm | 90° C. |
| Example 9 | 25 | 50 | 12.0 | | Performed | 40 nm | 110° C. |

| | Content of butyl stearate | | Ultrasonic vibration imparting conditions | | | Magnetic layer forming composition preparation conditions | | |
|---|---|---|---|---|---|---|---|---|
| | Magnetic layer forming composition | Non-magnetic layer forming composition | Imparting time | Frequency | Intensity | Number of times of passes of flow type ultrasonic dispersing device | Number of times of filtering | Filter hole diameter |
| Comparative Example 1 | 1.0 part | 4.0 parts | None | None | None | 2 times | 1 time | 1.0 μm |
| Comparative Example 2 | 1.0 part | 4.0 parts | None | None | None | 2 times | 1 time | 1.0 μm |
| Comparative Example 3 | 1.0 part | 4.0 parts | None | None | None | 2 times | 1 time | 1.0 μm |
| Comparative Example 4 | 1.0 part | 4.0 parts | None | None | None | 2 times | 1 time | 1.0 μm |
| Comparative Example 5 | 1.0 part | 4.0 parts | None | None | None | 2 times | 1 time | 1.0 μm |
| Comparative Example 6 | 1.0 part | 4.0 parts | None | None | None | 2 times | 1 time | 1.0 μm |
| Comparative Example 7 | 1.0 part | 4.0 parts | None | None | None | 2 times | 1 time | 1.0 μm |
| Comparative Example 8 | 1.0 part | 4.0 parts | None | None | None | 2 times | 1 time | 1.0 μm |
| Comparative Example 9 | 1.0 part | 4.0 parts | None | None | None | 2 times | 1 time | 1.0 μm |
| Comparative Example 10 | 1.0 part | 15.0 parts | 0.5 seconds | 30 kHz | 100 W | 2 times | 1 time | 1.0 μm |
| Comparative Example 11 | 0 part | 0 part | 0.5 seconds | 30 kHz | 100 W | 2 times | 1 time | 1.0 μm |
| Comparative Example 12 | 1.0 part | 4.0 parts | 0.5 seconds | 30 kHz | 100 W | 1 time | 1 time | 1.0 μm |
| Comparative Example 13 | 1.0 part | 4.0 parts | 0.5 seconds | 30 kHz | 100 W | 2 times | 1 time | 1.0 μm |
| Example 1 | 1.0 part | 4.0 parts | 0.5 seconds | 30 kHz | 100 W | 2 times | 1 time | 1.0 μm |
| Example 2 | 1.0 part | 4.0 parts | 0.5 seconds | 30 kHz | 100 W | 2 times | 1 time | 1.0 μm |
| Example 3 | 1.0 part | 4.0 parts | 0.5 seconds | 30 kHz | 100 W | 2 times | 1 time | 1.0 μm |
| Example 4 | 1.0 part | 4.0 parts | 0.5 seconds | 30 kHz | 100 W | 2 times | 1 time | 1.0 μm |
| Example 5 | 1.0 part | 4.0 parts | 0.5 seconds | 30 kHz | 100 W | 2 times | 1 time | 1.0 μm |
| Example 6 | 1.0 part | 4.0 parts | 0.5 seconds | 30 kHz | 100 W | 2 times | 1 time | 1.0 μm |
| Example 7 | 1.0 part | 4.0 parts | 3.0 seconds | 30 kHz | 100 W | 2 times | 1 time | 1.0 μm |
| Example 8 | 1.0 part | 4.0 parts | 0.5 seconds | 30 kHz | 100 W | 30 times | 5 times | 0.5 μm |
| Example 9 | 1.0 part | 4.0 parts | 3.0 seconds | 30 kHz | 100 W | 30 times | 5 times | 0.5 μm |

| | Center line average surface roughness Ra measured regarding surface of magnetic layer | $S_{after} - S_{before}$ | $FWHM_{before}$ | $FWHM_{after}$ | Magnetic cluster | | | Re-producing head | SNR (dB) | Number of times of occurrence of decrease in resistance value (times) | Rate of decrease in resistance value (%) |
|---|---|---|---|---|---|---|---|---|---|---|---|
| | | | | | Sdc (nm$^2$) | Sac (nm$^2$) | Sdc/Sac | | | | |
| Comparative Example 1 | 2.8 nm | 3.2 nm | 8.5 nm | 6.9 nm | 23000 | 15000 | 1.53 | GMR | 0 | 0 | 0 |
| Comparative Example 2 | 2.5 nm | 3.2 nm | 8.5 nm | 6.9 nm | 23000 | 15000 | 1.53 | GMR | 2.2 | 0 | 0 |
| Comparative Example 3 | 2.0 nm | 3.2 nm | 8.5 nm | 6.9 nm | 23000 | 15000 | 1.53 | GMR | 4.5 | 0 | 0 |
| Comparative Example 4 | 1.5 nm | 3.2 nm | 8.5 nm | 6.9 nm | 23000 | 15000 | 1.53 | GMR | 6.8 | 0 | 0 |
| Comparative Example 5 | 2.8 nm | 3.2 nm | 8.5 nm | 6.9 nm | 23000 | 15000 | 1.53 | TMR | 0.7 | 1 | — |
| Comparative Example 6 | 2.5 nm | 3.2 nm | 8.5 nm | 6.9 nm | 23000 | 15000 | 1.53 | TMR | 3.2 | 3 | — |

TABLE 1-continued

| | | | | | | | | | | |
|---|---|---|---|---|---|---|---|---|---|---|
| Comparative Example 7 | 2.0 nm | 3.2 nm | 8.5 nm | 6.9 nm | 23000 | 15000 | 1.53 | TMR | 5.5 | 7 | — |
| Comparative Example 8 | 1.5 nm | 3.2 nm | 8.5 nm | 6.9 nm | 23000 | 15000 | 1.53 | TMR | 7.7 | 9 | — |
| Comparative Example 9 | 2.0 nm | 3.2 nm | 8.5 nm | 6.9 nm | 19000 | 15000 | 1.27 | TMR | 7.0 | 7 | — |
| Comparative Example 10 | 2.0 nm | 11.0 nm | 6.8 nm | 6.9 nm | 19000 | 15000 | 1.27 | TMR | 7.0 | — | — |
| Comparative Example 11 | 2.0 nm | 0 nm | 6.8 nm | 6.9 nm | 19000 | 15000 | 1.27 | TMR | 7.0 | — | — |
| Comparative Example 12 | 2.0 nm | 3.2 nm | 6.8 nm | 7.5 nm | 19000 | 15000 | 1.27 | TMR | 7.0 | 7 | — |
| Comparative Example 13 | 2.0 nm | 3.2 nm | 6.8 nm | 6.9 nm | 23000 | 15000 | 1.53 | TMR | 5.5 | 0 | 5 |
| Example 1 | 2.0 nm | 3.2 nm | 6.8 nm | 6.9 nm | 19000 | 15000 | 1.27 | TMR | 7.0 | 0 | 5 |
| Example 2 | 2.0 nm | 3.2 nm | 6.8 nm | 6.9 nm | 16000 | 15000 | 1.07 | TMR | 7.2 | 0 | 5 |
| Example 3 | 2.0 nm | 3.2 nm | 6.8 nm | 6.9 nm | 14000 | 15000 | 0.93 | TMR | 7.5 | 0 | 5 |
| Example 4 | 2.0 nm | 3.2 nm | 6.8 nm | 6.9 nm | 12000 | 15000 | 0.80 | TMR | 7.3 | 0 | 5 |
| Example 5 | 2.0 nm | 3.2 nm | 6.8 nm | 6.9 nm | 24000 | 21000 | 1.14 | TMR | 7.2 | 0 | 5 |
| Example 6 | 2.0 nm | 3.2 nm | 6.8 nm | 6.9 nm | 11000 | 12000 | 0.92 | TMR | 7.5 | 0 | 5 |
| Example 7 | 2.0 nm | 3.2 nm | 4.1 nm | 6.9 nm | 14000 | 15000 | 0.93 | TMR | 7.5 | 0 | 4 |
| Example 8 | 2.0 nm | 3.2 nm | 6.8 nm | 4.0 nm | 14000 | 15000 | 0.93 | TMR | 7.5 | 0 | 2 |
| Example 9 | 1.5 nm | 3.2 nm | 4.1 nm | 4.0 nm | 14000 | 15000 | 0.93 | TMR | 9.3 | 0 | 11 |

As shown in Table 1, in Examples 1 to 9, the information recorded on the magnetic tape at high linear recording density could be reproduced at a high SNR by using the TMR head as the reproducing head. In addition, in Examples 1 to 9, it was possible to prevent a significant decrease in resistance value of the TMR head.

The invention is effective for usage of magnetic recording for which high-sensitivity reproducing of information recorded with high density is desired.

What is claimed is:

1. A magnetic tape device comprising:
   a magnetic tape; and
   a reproducing head,
   wherein the reproducing head is a magnetic head including a tunnel magnetoresistance effect type element as a reproducing element,
   the magnetic tape includes a non-magnetic support, and a magnetic layer including ferromagnetic powder, a binding agent, and fatty acid ester on the non-magnetic support,
   a center line average surface roughness Ra measured regarding a surface of the magnetic layer is equal to or smaller than 2.0 nm,
   a full width at half maximum of spacing distribution measured by optical interferometry regarding the surface of the magnetic layer before performing a vacuum heating with respect to the magnetic tape is greater than 0 nm and equal to or smaller than 7.0 nm,
   a full width at half maximum of spacing distribution measured by optical interferometry regarding the surface of the magnetic layer after performing the vacuum heating with respect to the magnetic tape is greater than 0 nm and equal to or smaller than 7.0 nm,
   a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and
   a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

2. The magnetic tape device according to claim 1, wherein the full width at half maximum of spacing distribution measured by optical interferometry regarding the surface of the magnetic layer before performing the vacuum heating with respect to the magnetic tape is 3.0 nm to 7.0 nm.

3. The magnetic tape device according to claim 1, wherein the full width at half maximum of spacing distribution measured by optical interferometry regarding the surface of the magnetic layer after performing the vacuum heating with respect to the magnetic tape is 3.0 nm to 7.0 nm.

4. The magnetic tape device according to claim 1, wherein the difference $S_{after}-S_{before}$ is 2.0 nm to 8.0 nm.

5. The magnetic tape device according to claim 1, wherein the center line average surface roughness Ra measured regarding the surface of the magnetic layer is 1.2 nm to 2.0 nm.

6. The magnetic tape device according to claim 1, wherein the magnetic tape includes a non-magnetic layer including non-magnetic powder and a binding agent between the non-magnetic support and the magnetic layer.

7. A magnetic reproducing method comprising:
   reproducing information recorded on a magnetic tape by a reproducing head,
   wherein the reproducing head is a magnetic head including a tunnel magnetoresistance effect type element as a reproducing element,
   the magnetic tape includes a non-magnetic support, and a magnetic layer including ferromagnetic powder, a binding agent, and fatty acid ester on the non-magnetic support,
   a center line average surface roughness Ra measured regarding a surface of the magnetic layer is equal to or smaller than 2.0 nm,
   a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

8. The magnetic reproducing method according to claim 7, wherein the full width at half maximum of spacing distribution measured by optical interferometry regarding the surface of the magnetic layer before performing the vacuum heating with respect to the magnetic tape is 3.0 nm to 7.0 nm.

9. The magnetic reproducing method according to claim 7, wherein the full width at half maximum of spacing distribution measured by optical interferometry regarding the surface of the magnetic layer after performing the vacuum heating with respect to the magnetic tape is 3.0 nm to 7.0 nm.

10. The magnetic reproducing method according to claim 7, wherein the difference $S_{after}-S_{before}$ is 2.0 nm to 8.0 nm.

11. The magnetic reproducing method according to claim 7, wherein the center line average surface roughness Ra measured regarding the surface of the magnetic layer is 1.2 nm to 2.0 nm.

12. The magnetic reproducing method according to claim 7, wherein the magnetic tape includes a non-magnetic layer including non-magnetic powder and a binding agent between the non-magnetic support and the magnetic layer.

* * * * *